United States Patent [19]

Kasman

[11] Patent Number: 5,181,204

[45] Date of Patent: Jan. 19, 1993

[54] METHOD AND APPARATUS FOR ERROR TRACKING IN A MULTITASKING ENVIRONMENT

[75] Inventor: Alexander Kasman, Sherman Oaks, Calif.

[73] Assignee: Telefonaktienbolaget L M Ericsson, Stockholm, Sweden

[21] Appl. No.: 544,413

[22] Filed: Jun. 27, 1990

[51] Int. Cl.$^5$ ............................................. G06F 11/00
[52] U.S. Cl. ................................... 371/16.5; 395/575
[58] Field of Search ................... 371/16.1, 29.1, 16.5; 395/575

[56] References Cited

U.S. PATENT DOCUMENTS

| | | | |
|---|---|---|---|
| 3,704,363 | 11/1972 | Salmassey et al. | 371/29.1 |
| 5,047,977 | 9/1991 | Hill et al. | 364/900 |
| 5,090,014 | 2/1992 | Polich et al. | 371/29.1 |

Primary Examiner—Charles E. Atkinson
Attorney, Agent, or Firm—Johnson & Gibbs

[57] ABSTRACT

An error flag setting arrangement for a multitasking environment requires all of a multiplicity of processes to use the same funtion to set an error flag indicator. Inside of this function, the flag indication is tested prior to setting to a new value. If the flag indication is already set, the function waits a predetermined period of time. In the event that the error indication is not reset within the predetermined period a message describing the current value of error indication is displayed on the screen and the error indication is set to the new value.

11 Claims, 3 Drawing Sheets

METHOD AND APPARATUS FOR ERROR TRACKING IN A MULTITASKING ENVIRONMENT

CROSS REFERENCE TO RELATED APPLICATIONS

This application is related to the following U.S. Patent Applications:

| TITLE | INVENTOR(S) | SER. NO. |
|---|---|---|
| Communications Protocol for Switching Systems | Clary et al. | 07/544,839 |
| Communications System Using a Fault Tolerant Protocol | Lee et al. | 07/544,675 |
| Language Independent Self-Centering Menu Handling of Traffic Recording Presentation | Lee | 07/544,679 |
| Graphic Value Indicator System | Diec et al. | 07/545,419 |

All cross reference applications have been filed on even date herewith and assigned to the assignee of the present invention. All of these related applications are hereby incorporated herein by reference.

BACKGROUND OF THE INVENTION

1. Field of the Invention

The present invention relates to error tracking and monitoring arrangements and, more particularly, to error tracking and monitoring arrangements in multitasking environments.

2. Description of Related Art

With the advent of multitasking environments (including multitask operating systems such as UNIX, GEM, Windows, Deskview, and OS/2, as well as the Traffic Recording Presentation system developed by the assignee of the present invention), it has become necessary to develop and provide mechanisms within those environments to track and monitor errors.

Heretofore a variety of systems and methods have been developed to perform the necessary error tracking and monitoring functions. Many of these systems and methods have been discussed in U.S. patents. For example, U.S. Pat. No. 4,133,477 to Marino et al. discloses a system in which a flag array is used to detect errors in a system having multiple processing components. Separate flags are associated with separate components, and the flags are operatively caused to trigger upon detection of a fault in their associated components. Marino et al. teach scanning the flag array, and upon detection of a fault flag, causing display of indicia relating to the fault location through the medium of a display. In Marino et al., however, errors are effectively only detected and reported with a single process. Another system for error tracking and monitoring is disclosed in U.S. Pat. No. 3,704,363 to Salmassey et al. which teaches the use of a data storage subsystem to record faults in multiple physical storage volumes within a data storage system. Salmassey et al. disclose a system for providing only error statistics, however, not a display, and do not include any teachings whatsoever about multitasking. Still other error tracking and monitoring systems are disclosed in U.S. Pat. Nos. 4,696,026 and 4,453,210 to Plouff and Suzuki et al., respectively. Plouff teaches simultaneously displaying the status of a plurality of switches, however, he does not mention what happens if errors occur simultaneously. Suzuki et al. teach a system, implementable by either software or hardware, in which a plurality of processors are provided with associated counters having codes therein. The individual processors periodically update their associated codes on a longer cycle than the cycle of the updating period. By not updating the fault supervising code corresponding to a processor if an error occurs in a processor, a faulty processor, can be detected by periodically supervising the update status of the fault supervising code. However, Suzuki et al., like Plouff, do not contemplate or discuss a situation in which multiple errors occur simultaneously.

Based on the foregoing it should be clear that notwithstanding the teachings of Marino et al. Salmassey et al., Plouff, and Suzuki et al., as well as other similar teachings of the prior art, a deficiency and shortcoming has heretofore existed with respect to errors occurring simultaneously in different processes of a multitasking environment. In many such multitasking environments, only one error can be handled at a time. This causes no problem as long as a detected error is corrected or otherwise handled before another error occurs. If, on the other hand, a first error is not handled before another error occurs in such multitasking environments, e.g., when errors occur simultaneously, the second error condition overrides the first error condition and it is lost. Thus, simultaneously occurring errors have not been effectively handled in prior art systems.

The above-described shortcoming and deficiency of the prior art is a serious one. Failure to provide a solution to the problem of overridden errors can cause inefficiencies in system diagnosis. On the other hand, providing a multitude of separate mechanisms to simultaneously handle multiple errors uses resources inefficiently and/or greatly increases the number of components and, hence, cost of a system in which error tracking is performed. Until development of the present invention, there was no efficient method for tracking errors in multitasking environments.

SUMMARY OF THE INVENTION

The present invention overcomes the deficiencies and shortcomings of the prior art by providing a method and apparatus for efficiently tracking errors in multitasking environments.

The method of the present invention for setting an error flag includes setting a timer, determining whether or not the error flag is presently set, setting the error flag to a new value if the error flag is presently set, determining whether or not the timer is expired if the error flag is not presently set, displaying the held value of the presently set error flag and resetting the error flag if the timer is expired, and redetermining whether the error flag remains set if the timer is not expired.

The apparatus of the present invention, which apparatus is effectively an error flag setting arrangement, includes means for setting a timer, means for determining whether or not the error flag is presently set, means for setting the error flag if the error flag is not presently set, means for determining whether or not the timer is expired if the error flag is presently set, means for displaying the held value of the presently set error flag and resetting the error flag if the timer is expired, and means for redetermining whether the error flag remains set if the timer is not expired.

Accordingly, it is an object of the present invention to provide a method and apparatus that efficiently tracks and monitors errors in a multitasking environment.

Another object of the present invention is to provide a method and apparatus that ensures one error condition does not override another in a multitasking environment.

BRIEF DESCRIPTION OF THE DRAWINGS

For a more complete understanding of the present invention, and for further objects and advantages thereof, reference may now be had to the following description taken in conjunction with the accompanying drawings in which.

DETAILED DESCRIPTION OF THE INVENTION

The present invention relates to a method and system for preventing one error condition from overriding another error condition when those two error conditions occur simultaneously in a multitasking environment. Although, as should be readily appreciated by those skilled in the art, such a method or system can be incorporated into any one or more of a multitude of different multitasking operating systems, for convenience in understanding the invention and an illustrative implementation thereof, the discussion below focuses on one particular embodiment of the method and system of the present invention which has been incorporated into an operative system. This operative system is the Traffic Recording Presentation system developed by the assignee of the present invention. Notwithstanding special focus on this Traffic Recording Presentation system herein, it should be noted that the present invention is by no means limited to that type of application or any such related application. On the contrary, any environment in which multiple tasks are performed and in which there is a possibility of simultaneous errors occurring (or the occurrence of a second error before a first error has been properly handled) is an environment into which the present invention can be employed.

Figure 1:
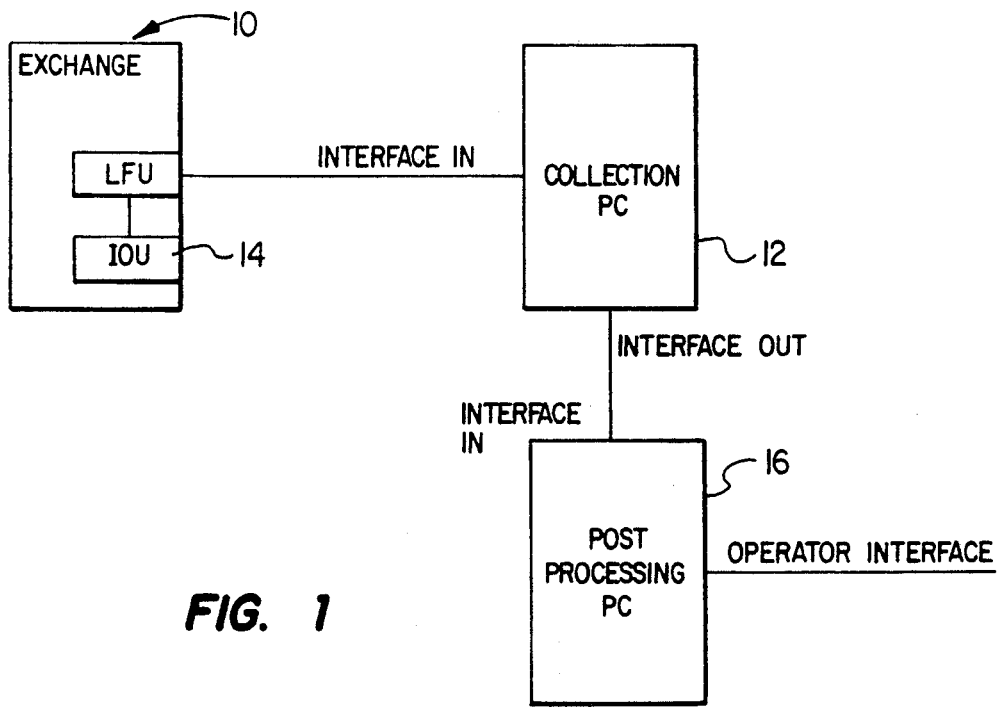
FIG. 1 is a block diagram showing major elements of and interfaces in a Traffic Recording Presentation system developed by the assignee of the present invention.

Referring now to FIG. 1, therein is shown a block diagram illustrating the major components of a Traffic Recording Presentation system as developed by the assignee of the present invention, with various interfaces between elements specially designated. Traffic recording data relating to a switch or an exchange 10 can be graphically presented using the method and system of the present invention using collection and postprocessing or presentation software running on a personal computer. The overall system of the present invention may, therefore, be broken into two parts: the collection part and the postprocessing or presentation part. Referring to FIG. 1 it may be seen that a collection PC (i.e., the collecting part) 12 is connected from a serial interface to an input/output unit board 14 in the switch or exchange 10. The collection PC 12 also has a connection from another serial port to a modem (or directly) to a post processing or presentation PC (i.e., the post processing or presentation part) 16.

The collection PC 12 can support a printer via a standard parallel interface for an automatic print function. The exact time and days the recorded data are printed out are defined as an option by the postprocessing function.

The postprocessing or presentation PC 16 could be common for a number of installations and is able to dial up a number of collection PC's to initiate transfer of the data collected. It could also have a direct connection to only one collection PC, as discussed further below. Additionally, as should be apparent to those skilled in the art, it is also possible to use only one PC to perform the two functions mentioned above. In such a case, however, no collection could probably be done while the PC was being used for the display function.

The presentation PC supports a monitor for operator presentation of collected traffic measurement data. Further details regarding the presentation of data via such a monitor are set forth at length in the above-referenced related case entitled Graphic Value Indicator System, which case is incorporated by reference herein.

Referring still further to FIG. 1, it may be seen that various interfaces between the different elements shown are specifically set forth. The "interface in" interface, that is, the interface between the exchange 10 and the collection PC 12, may be a standard V24 or other such interface. Typically, a collection PC 12 would not have an operator interface after installation.

The interface between the collection and presentation PC's, PC's 12 and 16, respectively, depends upon the process configuration. If the postprocessing software co-resides within the collection PC 12 with the collection software, no transfer of data is required. However, in the non-co-resident cases, each PC uses a serial communication port, typically employing EIA/RS232-C standards.

With regard to the logical interface, data stored in the collection PC 12 can only be transferred to the presentation PC 16 on request from the presentation PC 16. This can be a manually initiated operation or set up to be done automatically at a certain time every day.

The operator interface for the presentation PC 16 is menu driven. Of course, the exact menus that would be used are a matter of some design. Further details regarding menus are set forth at some length in the above-referenced related case entitled Language Independent Self-Centering Menu Handling of Traffic Recording Presentation, incorporated by reference herein.

A traffic recording presentation system such as that described above can be installed in an IBM PC/XT, AT, or compatible to collect and store traffic recording data, least cost routing traffic measurement counters, and least cost routing queue counters retrieved from an exchange. The stored data is then available for automatic printing, postprocessing, or both. The postprocessing function retrieves traffic recording data from the data collection PC for graphic presentation, directory lookup, summary report generation or the like. The postprocessing or presentation function can support, in various embodiments of the present invention, up to eight exchanges.

The traffic recording system described above can be configured in three ways. The three ways are: co-resident configuration, remote connection and direct connection. The different configurations are based on where the software is loaded and the number of PC's used.

Figure 2:
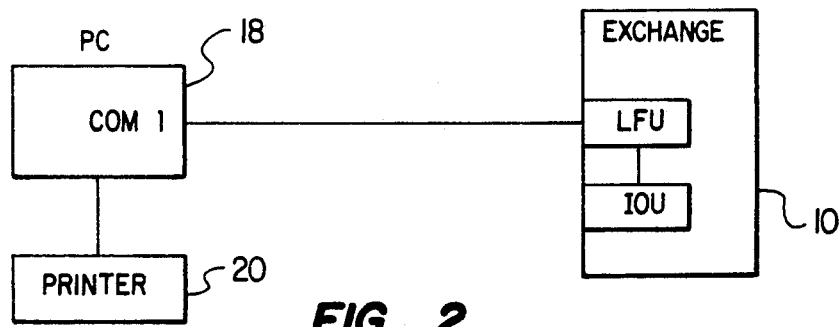
FIG. 2 is a block diagram of a system including the present invention in a co-resident configuration.

In a co-resident configuration, shown in FIG. 2, both the data collection software and the postprocessing software reside in one PC 18. The PC 18 may be called a data collection PC when referring to the data collection function and called a postprocessing or presentation PC when referring to the postprocessing or presentation function. There is a restriction in the configuration in that the data collection function cannot be running simultaneously with the postprocessing function, at least in current embodiments of the Traffic Recording Presentation system heretofore built. It may be noted that a printer 20 is also shown in FIG. 2 for the automatic print function which has been heretofore discussed.

Figure 3:
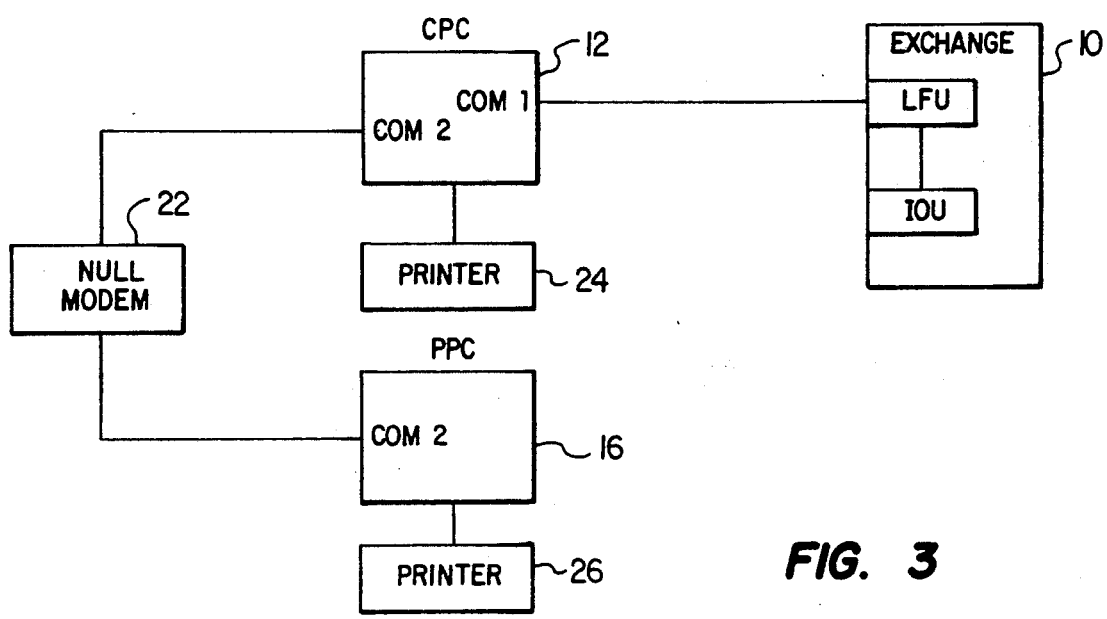
FIG. 3 is a block diagram of a system including the present invention in a direct connection configuration.

In a direct connection configuration, shown in FIG. 3, the data collection software and postprocessing software reside in two separate PC's. These two PC's are then directly connected with one another by means of such as a null modem 22, as shown in FIG. 2. Further with reference to FIG. 2, it may be seen that the collection PC and presentation PC may have associated printers, e.g., printers 24 and 26, respectively.

Figure 4:
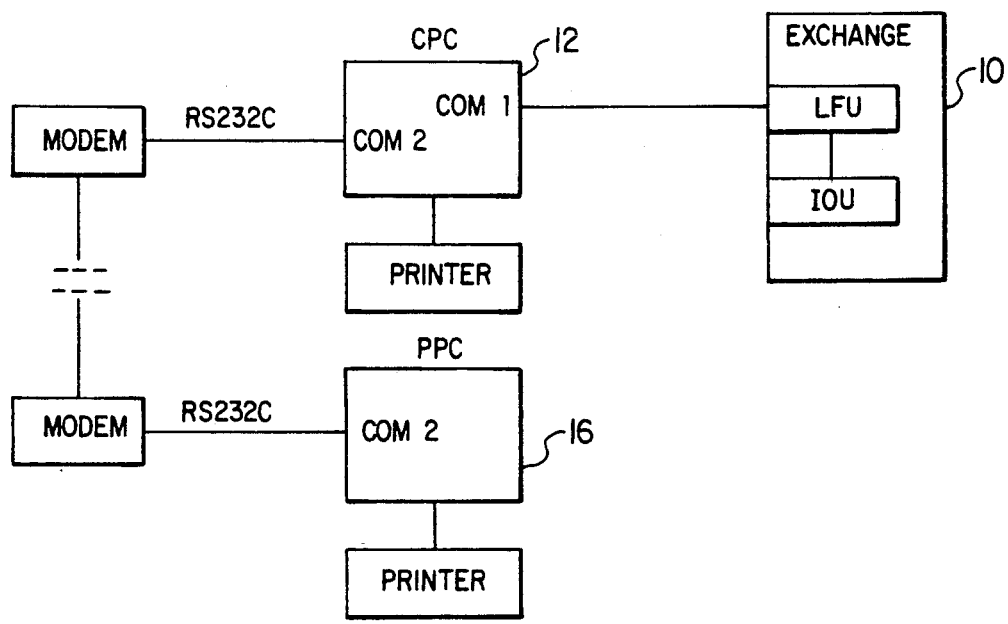
FIG. 4 is a block diagram of a system including the present invention in a remote connection configuration.

A remote connection configuration, shown in FIG. 4, requires one postprocessing or presentation PC. For each exchange that it supports, a data collection PC (e.g., PC 12 shown in FIG. 4) is required. The data collection software and the postprocessing software reside in separate PC's which are connected by dial up via a pair of modems.

The data collection PC is always co-located within the exchange. The serial port of the data collection PC is connected to the input/output unit board of the exchange.

The data collection function collects traffic recording data from an exchange, such as an MD-110 exchange manufactured by the assignee of the present invention. In general, it collects three types of data: traffic recording data; least cost routing traffic measurement counters ("LCR-TM counters"); and least cost routing-queue counters ("LCR-queue counters"). Traffic recording data consists of such objects as PABX operator manned time, data extension, trunks, dial tone delay, paging, and incoming and outgoing routes. When such measurement objects are initiated within an exchange, they can be collected in a, e.g., fifteen minute interval in the exchange. The data in the exchange can then be collected by the data collection PC function and stored on a hard disk. The traffic data recording routine can be automatically started and no user initiation required. The traffic recording data collection function can acquire the traffic recording directory from the exchange, if it exists, and use it to collect traffic recording data. If no directory exists, no data are collected. The LCR-TM counters are the number of call attempts to destinations and the number of calls successfully completed. These counters are collected at the end of a predetermined time period, e.g., an hour, for the time interval that the user has specified. The initiation of the LCR-TM counters collection routine is implemented via the postprocessing function. The LCR-queue counters are the number of queued calls, timed-out queue missions, and on-hook queuing time accumulated towards a first and a second threshold when searching for a free trunk. The data collection function collects these counters at the end of, e.g., each hour for the time that the user has specified. The initiation of LCR-queue counters collection routine is implemented via the postprocessing function.

After the data from the exchange are collected, they are stored on a hard disk for further processing. For a co-resident configuration, the postprocessing function transfers data files that were created by the data collection function to a format that the postprocessing function can access. For remote and direct configurations, the postprocessing function retrieves data from the data collection PC and stores it in the postprocessing or presentation PC. In embodiments of the Traffic Recording Presentation system described herein, an automatic print function, residing in the data collection PC, can be incorporated.

Various postprocessing functions include administration, data retrieval, directory information, summary reports, and graphs. With respect to administration, administrative function allows administrators to set up postprocessing data, e.g., activation/deactivation/list of automatic print parameters, LCR-TM parameters, and so on. The postprocessing function via its data retrieval function is able to communicate with each supported exchange and to retrieve data from data collection PC's. With regard to directory information, the user may list the objects that are stored and available for each exchange by using the directory information function. The postprocessing function also allows the user to generate summary reports for a specified date. Finally, as mentioned in much greater detail in the above-referenced related co-pending application entitled Graphic Value Indicator System, there are graphs that are defined for each recorded object. In one particular embodiment of the present invention actually constructed, a maximum of four graphs (with the exception of the LCR) are displayed simultaneously using one or two scales on the left and right. The LCR can display seven graphs simultaneously. Each graph contains a time axis that can extend over one of the following periods: a month, a week and a day. Users of the graphs may also choose to have automatic or manual left and right scaling and, when a graph is displayed, the user may change the time range or the starting data of the graph. Also, the user can enter the up, down, page up, page down key to move the grid line up or down in order to precisely ascertain values on the graph, which are displayed in the upper left or right hand side of the screen. In addition to the foregoing, graphs can be printed or stored to the data file. Further details may be found in the related case.

In general, in embodiments of the Traffic Recording Presentation system described above, an error recovery process is embedded in the processes which are used for data retrieval and presentation. When the error case can be recovered, a fault is typically not reported. If, on the other hand, the error case cannot be recovered, it will be reported to a fault log. If the error can be reported to the monitor, it will also be displayed. As should be appreciated by those skilled in the art, there are a multitude of errors that can be generated if the system described above fails to function properly. By way of example only, a number of such errors are set forth below:

input buffer overrun
 error deleting file wrong message size from presentation PC
insufficient memory
error reading file
exchange timeout
insufficient disk space
reading error in traffic measurement file
error resetting the printer The system described above has no problem functioning with respect to errors as long as the errors do not occur simultaneously or otherwise so that one error can occur and override a second error. The present invention has been developed to provide a solution to this problem.

In general, according to the teachings of the present invention, all processes within a multitasking environment must use the same function to set an error flag indication. Inside of this function (the name of which is SetError in the Traffic Recording Presentation system described herein) the flag indication is tested prior to setting a new value. If the flag indication is already set, the function setter will wait for a predetermined period of time. In case the error indication is not reset within this period, a message described in the current value of the error indication is displayed on the screen and the error indication is set to the new value.

Figure 5:
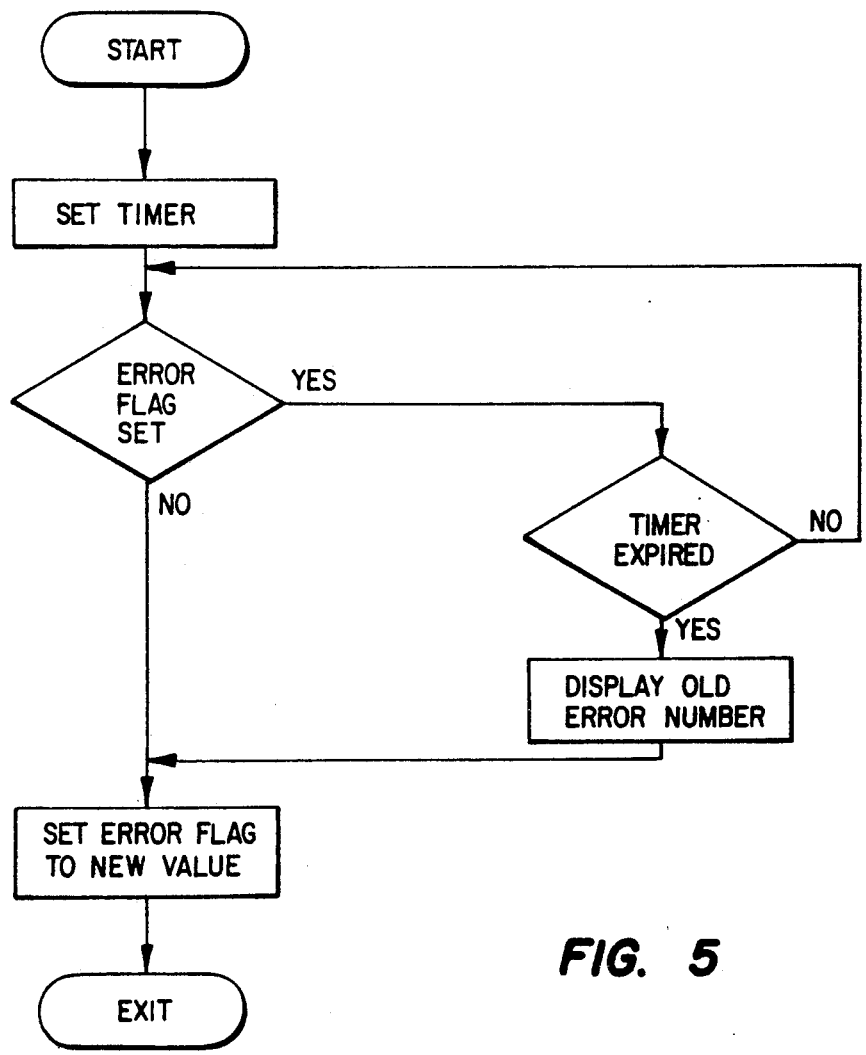
FIG. 5 is a flow chart of logic employed by the method and apparatus of the present invention and FIG. 6 is a block diagram of an apparatus according to the teachings of the present invention.

Further details regarding this can be clearly seen in the flow chart set forth as FIG. 5 wherein it may be seen that the timer is set at the start of the function. Next, the program inquires whether the error flag is set. If not, the error flag is set to the new value and the program terminates. If, on the other hand, the error flag is set, inquiry is made as to whether or not the timer has expired. If the time has not expired, another inquiry is made as to whether or not the error flag is set. If the timer has expired, on the other hand, the old error number is displayed on the screen and the error flag is set to the new value, whereupon the program terminates.

Those skilled in the art should appreciate that this type of process according to the teachings of the present invention provides a unique solution to the problem of simultaneous errors when contention devices are allocated in a multitasking environment. In such an environment, when a device is being used by a process, other processes are not permitted to access such a device until the block is cleared. Thus, any of a multitude of multi-task operating systems (e.g., UNIX, GEM, Windows, Deskview, OS/2 and so on) could benefit from the present invention.

To assist those especially skilled in the computer programming arts in understanding how the present invention might be affected, set forth below, by way of example only, is a computer program such as could and has been used to implement the method of the present invention in a Traffic Recording Presentation system such as has been described generally herein:

```
/*******************************************************************/
/* void alarm(int) - this function will write error message in     */
/*     error window and alarm file. Then, call my_exit.            */
/*                                                                  */
/* ARGUMENTS:                                                       */
/*   int status = return code.                                      */
/*                                                                  */
/* RETURNS: none                                                    */
/*                                                                  */
/*******************************************************************/
void alarm(status)
int status;
{
    char *name;
    struct TIMEDATE *now;
    int error;                    /* current error */
    int alarm_fh;                 /* file handle for alarm file */
    char msg[80];                 /* message should be smaller than err_w size */
    memset(msg, ' \0', sizeof(msg));   /* clear message buffer */
    error = TM_error;             /* save error */
    TM_error = FALSE;             /* reset error */
    name = task_name((TCB_S *) NULL);  /* get task's name */
    if (name == NULL)
        name = "main function";
    now = sgettime(4);                 /* get date information */
    visible(err_w, YES, NO);
    /* construct error message */
    sprintf(msg, "%s - %s: %2d ", now -> dateline, name, error);
    if (error < MAX_ERROR) {
        strcat(msg, tm_errors[error]);
    }
    else {
        strcat(msg, tm_errors[MAX_ERROR]);
    }
    msg[strlen(msg)] = '\n';           /* end of line */
    task_lock( );
    if ((alarm_fh=open(ALARM_FILE, O_CREAT | O_APPEND | O_TEXT | O_WRONLY,
                        S_IREAD | S_IWRITE)) == -1) {
        vdispf(err_w, errmsg[ERRMSG_ALM_OPEN], error, dos_errno);
        my_exit(status);
    }
    vdispstr(err_w, msg);              /* display in error window */
    if (write(alarm_fh, msg, strlen(msg)) ! = strlen(msg)) {/* write to file */
        vdispf(err_w, errmsg[ERRMSG_ALM_WRITE], error, dos_errno);
    close(alarm_fh);
    task_release( );
    my_exit(status);
    }
```

```
        if (dos_errno) {                /* system error */
/*
            sprintf(msg, "System error %d: %s n", dos_errno, strerror(dos_errno));
            vdispstr(err_w, msg);
            if (write(alarm_fh, msg, strlen(msg)) ! = strlen(msg)) {
                vdispf(err_w, errmsg[ERRMSG_ALM_WRITE], error, dos_errno);
            }
*/
            errno = 0;                  /* reset system error */
        }
        if (close(alarm_fh)) {
            vdispf(err_w, errmsg[ERRMSG_ALM_CLOSE], error, dos_errno);
        }
        task_release();
        my_exit(status);
}
*********************************************************/
```

Figure 6:
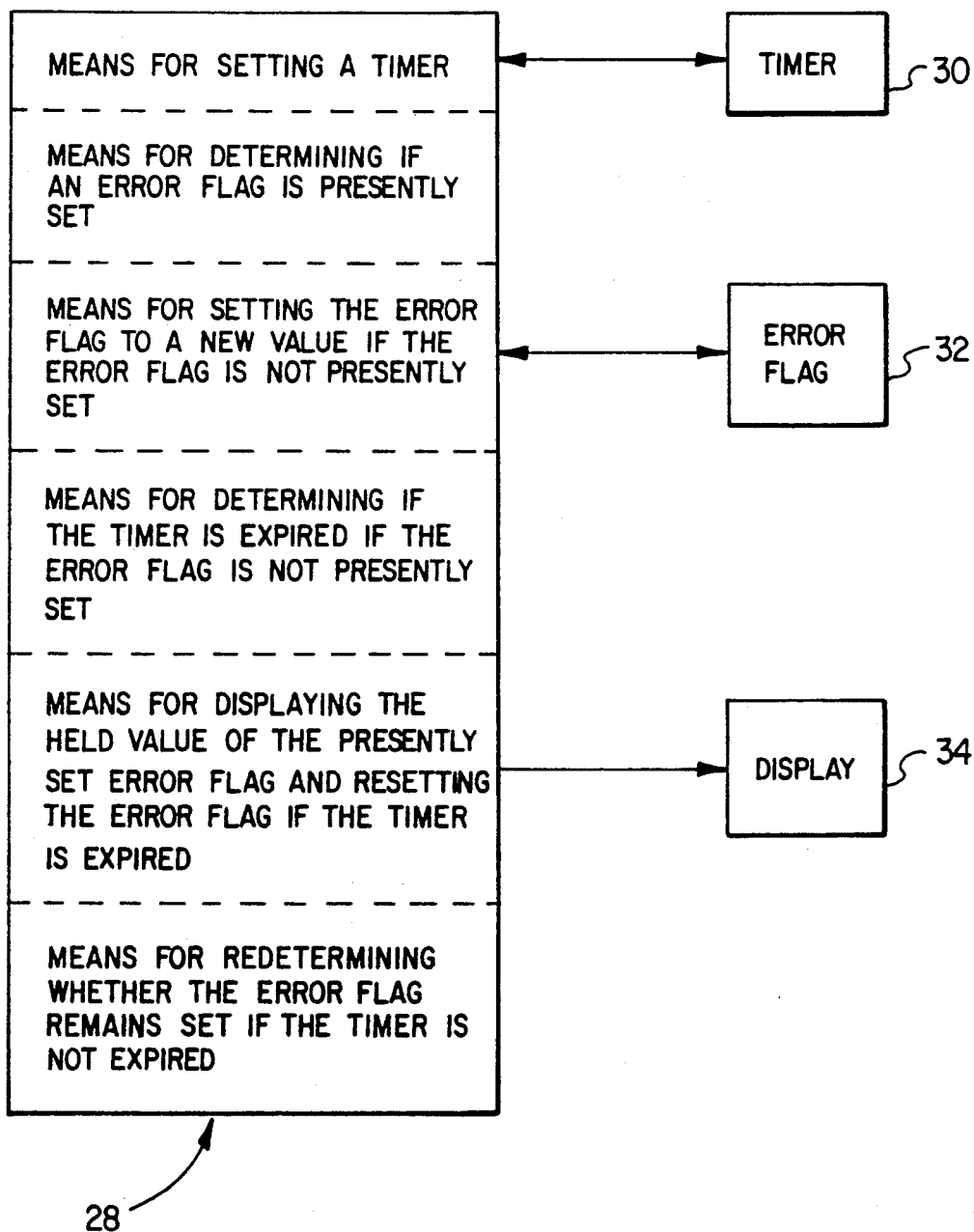

To assist those skilled in the art even further in understanding how the apparatus of the present invention might be implemented, set forth in FIG. 6 is a block diagram of an apparatus according to the teachings of the present invention. This apparatus may be seen to include means for setting a timer, means for determining if an error flag is presently set, means for setting the error flag to a new value if the error flag is not presently set, means for determining if the timer is expired if the error flag is not presently set, means for displaying the held value of the presently set error flag and resetting the error flag if the timer is expired, and means for redetermining whether the error flag remains set if the timer is not expired. Each of these means is, for example, implementable in software 28, to run in a PC, e.g., PC 12 or 16 (see FIG. 1). Operatively connected to these means in a conventional manner is a timer 30, a flag 32, and a display 34. Possible interconnections between and a manner in which the foregoing elements 28, 30, 32, 34 may cooperate in operation should now be clear to those skilled in the art, especially in view of the sample program above.

Based on the foregoing, those skilled in the art should appreciate that the present invention provides a solution to the problem of errors occurring simultaneously in different processes in a multitasking environment. The present invention solves the problem of one error condition overriding another and also provides the means by which the error conditions can be presented to a user. Thus, the present invention prevents loss of error indications in a multitasking environment and the present invention is also particularly valuable because it minimizes the number of resources used.

Numerous modifications and variations are possible in view of the above teachings. Accordingly, within the scope of the appended claims, the present invention may be practiced otherwise than as specifically described herein above.

What is claimed is:

1. A method for setting an error flag comprising the steps of:
   setting a timer;
   determining whether or not said error flag is presently set;
   setting said error flag to a new value if said error flag is not presently set;
   determining whether or not said timer is expired if said error flag is not presently set;
   displaying the held value of said presently set error flag and resetting the error flag if said timer is expired; and
   redetermining whether said error flag remains set if said timer is not expired.

2. An error flag setting arrangement comprising:
   means for setting a timer;
   means for determining whether or not said error flag is presently set;
   means for setting said error flag if said error flag is not presently set;
   means for determining whether or not said timer is expired if said error flag is not presently set;
   means for displaying the held value of said presently set error flag and resetting the error flag if said timer is expired; and
   means for redetermining whether said error flag remains set if said timer is not expired.

3. The arrangement of claim 1, wherein all of said means are included within a personal computer.

4. The arrangement of claim 3, wherein said personal computer is connected to an exchange.

5. The arrangement of claim 4, wherein said computer operates in a system to record and present data regarding traffic within said exchange.

6. In a multitasking environment, a system for tracking and monitoring errors comprising:
   means for setting a timer;
   means for determining whether or not said error flag is presently set;
   means for setting said error flag to a new value if said error flag is not presently set;
   means for determining whether or not said timer is expired if said error flag is not presently set;
   means for displaying the held value of said presently set error flag and resetting said error flag if said timer is expired; and
   means for redetermining whether said error flag remains set if said timer is not expired.

7. A system as recited in claim 6, wherein all of said means comprise a computer program within a personal computer.

8. A system as recited in claim 6, wherein said multitasking environment comprises a traffic recording presentation environment.

9. A system as recited in claim 8, wherein said traffic comprises traffic in an exchange.

10. A system as recited in claim 9, wherein said exchange handles digital traffic.

11. A system as recited in claim 10, wherein said exchange also handles analog traffic.

* * * * *